Dec. 27, 1955  L. B. SMITH  2,728,409
GAS SCRUBBER
Filed Nov. 19, 1953  2 Sheets-Sheet 1

INVENTOR.
LLOYD B. SMITH
BY
Jennings & Carter
ATTORNEYS

Dec. 27, 1955   L. B. SMITH   2,728,409
GAS SCRUBBER

Filed Nov. 19, 1953   2 Sheets-Sheet 2

INVENTOR.
LLOYD B. SMITH
BY
Jennings & Carter
ATTORNEYS

United States Patent Office 2,728,409
Patented Dec. 27, 1955

2,728,409

GAS SCRUBBER

Lloyd B. Smith, Birmingham, Ala., assignor to Fly Ash Arrestor Corporation, a corporation of Alabama Application November 19, 1953, Serial No. 393,108

4 Claims. (Cl. 183—22)

This invention relates to apparatus for washing solid matter out of gases and has for an object the provision of apparatus of the character designated which shall be simple of design, economical of manufacture and reliable in operation.

A more specific object of my invention is to provide apparatus for scrubbing gases in which the gas is caused to travel in a circular path over a turbulent body of water in which the solids are deposited and which shall include other means for separating entrained water from the gases as they leave the apparatus.

A still further object of my invention is to provide apparatus for washing solids out of gases in which the gases are brought into contact with a body of water by a circular motion over the water, and in which entrained water is thereafter separated from the gases by causing them to travel in a circular path in a direction opposite to that when the water was entrained.

Another object of my invention is to provide a gas scrubber in which the solids in the gases are collected in a body of water by passing them thereover in a circular motion and which shall be so constructed as to cause the solids to migrate to a central point in the apparatus from which they are discharged.

Briefly, my invention comprises an outer cylindrical casing having a radially directed gas inlet at one side in the upper portion thereof and a concentric gas outlet conduit extending through the upper end of the casing. Disposed concentrically within the outer casing is a cylindrical drum which is smaller in diameter and shorter than the outer casing whereby to provide an upper inlet chamber, and a lower gas scrubbing chamber, connected by an annular passage between the inner drum and the outer casing. A plurality of horizontally disposed vanes which are inclined to the vertical, are joined to the lower end of the inner drum and span the annular passage whereby gases flowing downwardly through the annular passage into the lower scrubbing chamber have imparted to them a circular motion. A body of water is maintained in the lower end of the apparatus with the level normally slightly above the lower edges of the vanes so that the gases entering the scrubbing chamber pass over the surface of the water and in their circular motion create turbulence in the water which aids in removing the solids therefrom. The outlet conduit is joined to the upper end of the inner drum and the gases passing upwardly toward the gas outlet have imparted to them a circular motion in a direction counter to that imparted by the vanes whereby to free them of the water entrained in the scrubbing action.

These and other features of my invention are illustrated in the accompanying drawings, forming a part of this application, in which.

Figure 1:
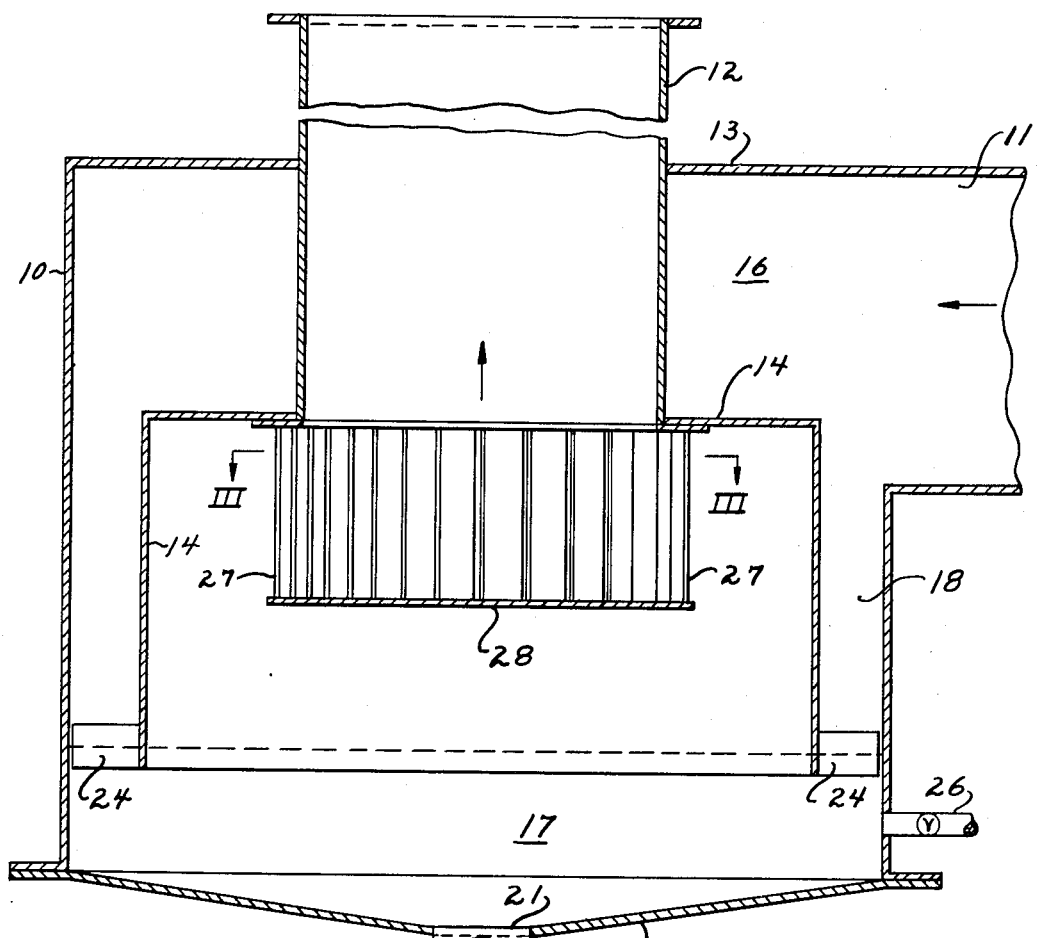
Fig. 1 is a vertical sectional view of the apparatus.

Referring to the drawings for a better understanding of my invention, I show a cylindrical outer casing 10 having a radially directed gas inlet 11 in the upper portion thereof, near the top. A gas outlet flue, or conduit 12 extends downwardly through the top 13 of the casing, concentrically therewith. Joined to the lower end of the gas flue 12 and supported thereby is an inner cylindrical drum 14 which is shorter than the outer cylindrical casing and smaller in diameter and is so disposed as to provide an upper gas inlet chamber 16 and a lower gas scrubbing chamber 17 which are connected by an annular passage 18 formed between the drum 14 and the casing 10. The outer casing 10 is provided with a conical bottom 19 having a centrally disposed outlet 21 to which is connected a conduit 22 having a valve 23 therein for the periodical discharge of solid matter collected in the casing.

Figure 2:
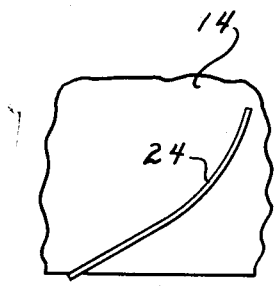
Fig. 2 is a detail elevational view showing one of the vanes which are secured to the lower end of the inner drum.

The drum 14 is open at the bottom, as shown in Fig. 1, and closed at the top except for the outlet flue 12 into which it opens. Secured to the lower end of the drum 14 and spanning the passage 18 between the drum and the casing 10, are a series of vanes 24 which are horizontally disposed and vertically inclined, as shown in Fig. 2 of the drawing, whereby gases entering the casing 10 and passing downwardly through the annular passage 18 have imparted to them a circular motion. Water is maintained in the lower end of the casing at a level around one inch above the lower edges of the vanes 24 whereby the entering gases impart to the water a turbulent circular motion which aids in removing the solids from the gases. The water level in the lower end of the casing 10 may be maintained by any suitable means, indicated diagrammatically by the valved conduit 26.

Figure 3:
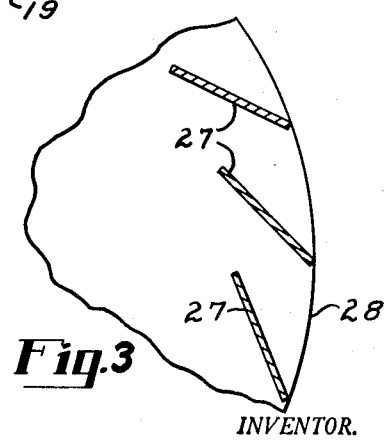
Fig. 3 is a detail sectional view taken along the line III—III of Fig. 1 showing the vertically disposed vanes for imparting motion to the leaving gases.
Figure 5:
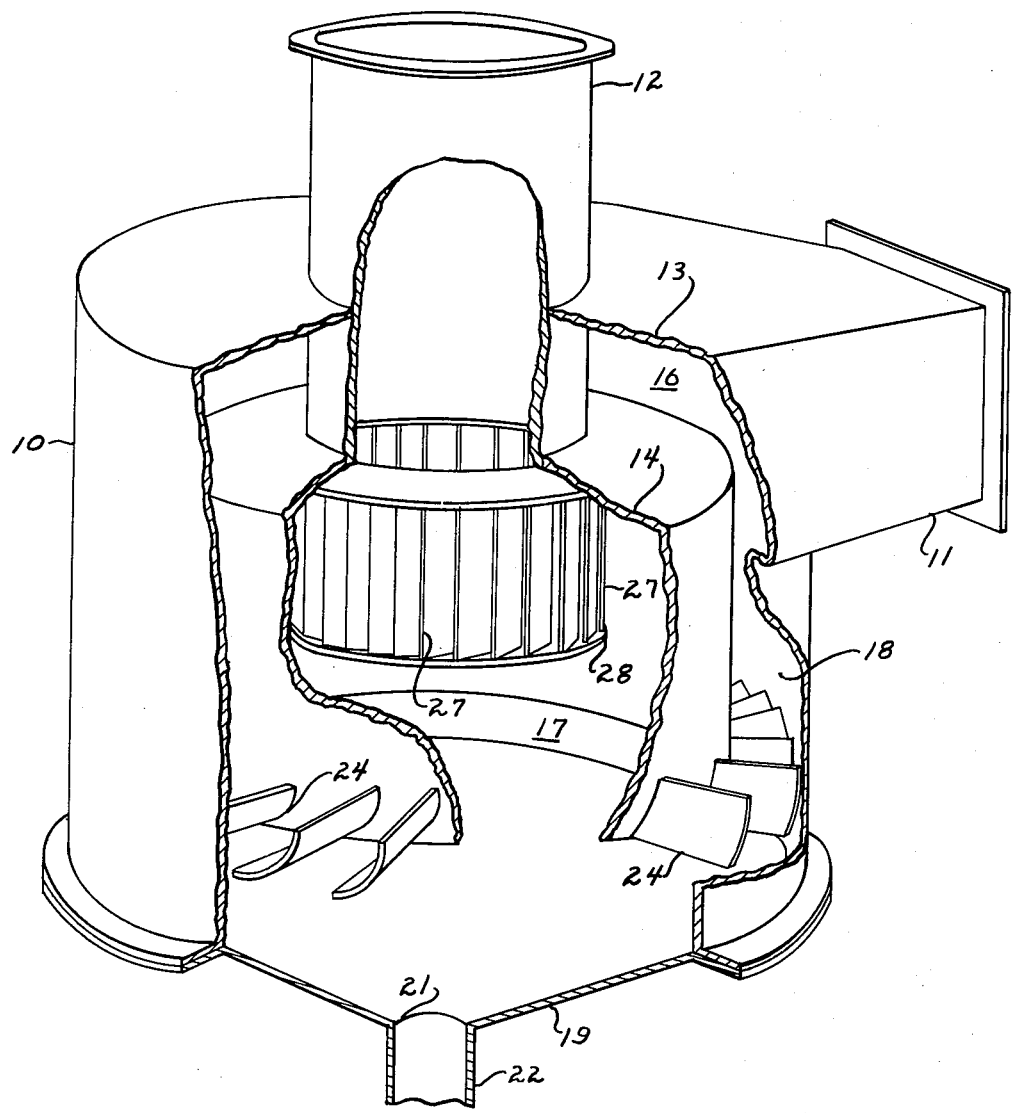
Fig. 5 is a diagrammatic perspective view illustrating the operation of the apparatus.
Figure 4:
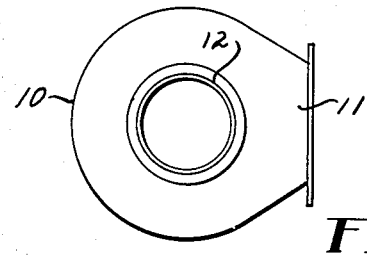
Fig. 4 is a plan view of the apparatus drawn to a smaller scale.

The gases entering the inner drum 14 from the outer casing, as just described, pass upwardly toward the gas outlet 12. Surrounding the gas outlet and extending downwardly from the top of the inner drum 14, are a series of vertically disposed vanes 27 which are inclined to the radial, as shown in Fig. 3, approximately 45°, whereby to impart a circular motion to the gases passing into the outlet flue 12. The lower ends of the vanes 27 are connected to a plate 28 which extends entirely across the series, spanning the outlet 12. It will be noted that the vanes 27 are so directed as to impart to the gases a circular motion opposite to that imparted to them by the vanes 24. At this point there thus occurs an abrupt change of direction of the gases which serves to throw out any water which may be entrained with the gases in the scrubbing operation.

The circular motion imparted to the water in the lower end of the outer casing 10 by the circular motion of the gases, causes the solids in the water to move downwardly along the conical bottom 19 toward the center where they may be discharged through the conduit 22.

From the foregoing it will be apparent that I have devised an improved gas scrubber which is simple of design and operation and wherein the solids contained in the gases are removed by passing them through a body of water and in which the entrained water in the gases is separated therefrom before they are finally discharged.

While I have shown my invention in but one form, it will be obvious to those skilled in the art that it is not so limited, but is susceptible of various changes and modifications without departing from the spirit thereof and I desire, therefore, that only such limitations shall be placed thereupon as are specifically set forth in the appended claims.

What I claim is:

1. A gas scrubber comprising an outer cylindrical casing having a lateral gas inlet in the upper portion thereof, an inner drum open at its lower end and closed at its upper end shorter and smaller in diameter than the outer casing disposed concentrically within the outer casing to provide upper and lower chambers connected by an annular passage between the drum and the casing, a multiplicity of horizontally disposed vertically inclined vanes between the lower portion of the drum and the outer casing to impart a circular motion to the gases passing into the inner drum, a body of water in the lower end of the outer casing adjacent the bottom of the drum, a gas outlet concentric with the drum and the outer casing and extending upwardly from the drum and the outer casing, an annular series of vertically disposed vanes inclined to the radial and extending downwardly from the top of the inner drum around the gas outlet, and a horizontal plate extending across and joined to the lower ends of the vanes.

2. Apparatus as defined in claim 1 in which the vertically disposed vanes are inclined in a direction to impart to the discharging gases a circular motion opposed to that imparted by the horizontally disposed vanes.

3. Apparatus as defined in claim 1 in which the outer casing is provided with a conical bottom having a centrally disposed outlet for the discharge of solids collected therein.

4. Apparatus as defined in claim 1 including means to admit water to the lower end of the casing to maintain it at the required level.

References Cited in the file of this patent

UNITED STATES PATENTS

| | | |
|---|---|---|
| 821,425 | Meehan | May 22, 1906 |
| 1,349,608 | Donaldson | Aug. 17, 1920 |

FOREIGN PATENTS

| | | |
|---|---|---|
| 316,594 | Germany | Dec. 12, 1919 |
| 485,807 | Great Britain | May 15, 1938 |